United States Patent
Garnaes

(10) Patent No.: US 6,525,518 B1
(45) Date of Patent: Feb. 25, 2003

(54) METHOD FOR MEASURING AND CONTROLLING OSCILLATIONS IN A WIND TURBINE

(75) Inventor: Svend Garnaes, Svendborg (DK)

(73) Assignee: Dan-Contol Engineering A/S, Hammel (DK)

(*) Notice: Subject to any disclaimer, the term of this patent is extended or adjusted under 35 U.S.C. 154(b) by 0 days.

(21) Appl. No.: 09/600,286
(22) PCT Filed: Jan. 14, 1999
(86) PCT No.: PCT/DK99/00020
§ 371 (c)(1),
(2), (4) Date: Nov. 8, 2000
(87) PCT Pub. No.: WO99/36695
PCT Pub. Date: Jul. 22, 1999

(30) Foreign Application Priority Data

Jan. 14, 1998 (DK) .......................................... 1998 00046

(51) Int. Cl.⁷ ......................... G01D 1/14; G01B 7/00; G01H 1/06; F01D 7/00
(52) U.S. Cl. ................ 324/76.13; 324/207.12; 73/579; 416/35
(58) Field of Search ..................... 324/76.13, 207.12, 324/318; 416/35, 500; 702/56; 73/579

(56) References Cited

U.S. PATENT DOCUMENTS

| 3,758,758 A | * | 9/1973 | Games et al. ................. 702/56 |
| 4,160,170 A | | 7/1979 | Harner et al. |
| 4,435,647 A | | 3/1984 | Harner et al. |
| 4,515,525 A | * | 5/1985 | Doman ......................... 416/11 |
| 5,140,856 A | * | 8/1992 | Larsen ......................... 73/455 |
| 5,614,676 A | | 3/1997 | Dutt et al. |
| 6,137,187 A | * | 10/2000 | Mikhail et al. ................ 290/44 |
| 6,327,957 B1 | * | 12/2001 | Carter ............................ 91/41 |

FOREIGN PATENT DOCUMENTS

GB          A2096770          10/1982

* cited by examiner

Primary Examiner—N. Le
Assistant Examiner—Anjan K. Deb
(74) Attorney, Agent, or Firm—Birch, Stewart, Kolasch & Birch, LLP

(57) ABSTRACT

A method for measuring and controlling oscillations in a wind turbine with the wind turbine control system using spectrum analysis, to determine the existence and amplitude of vibrations on the basis of existing sensor/transducer signals relating to the characteristics of the electrical power output. The control system of the wind turbine is adapted to attenuate the oscillations before they reach an unacceptable level, and thereafter to cause the wind turbine to resume normal operation.

13 Claims, 2 Drawing Sheets

METHOD FOR MEASURING AND CONTROLLING OSCILLATIONS IN A WIND TURBINE

BACKGROUND OF THE INVENTION

1. Field of the Invention

The present invention relates to a method for measuring and controlling oscillations in a wind turbine coupled directly to a power mains, voltage and/or current being measured at the mains connection and other values being optionally derived therefrom, such as apparent power, real power, reactive power, power factor, and cos($\phi$).

2. Description of the Related Art

The development of wind turbines leads to increasingly bigger turbines with increasing hub heights and rotor diameters. This creates a number of mechanical difficulties caused by the correspondingly lower natural resonance frequencies and attenuations of the structures used.

Furthermore, certain rotor blades in common use show a tendency to form a complex pattern of rotor blade oscillations of great amplitude under certain meteorological conditions. This exposes the rotor blades to unacceptable dynamic loads reducing their time of life and endangering the wind turbine safety.

It is essential for the structural safety of the wind turbine and thus also for human safety to be able to detect both oscillations of the wind turbine rotor blades and other structural oscillations of the wind turbine and to be able to stop these oscillations, e.g. by a temporary wind turbine standstill or in any other way.

A general wind turbine standstill under meteorological conditions that appear to facilitate the oscillation phenomena is not a practicable solution as it would be detrimental to the annual output of the wind turbine. It is therefore desirable to be capable of detecting the presence or absence of the oscillation phenomena and to be capable of adjusting the wind turbine control means so as to stop any occurring oscillation phenomenon so that the wind turbine may resume normal operation once the oscillation phenomenon has ceased.

Certainly all wind turbines have been provided with a device capable of detecting heavy oscillations and bringing the turbine to a standstill by interacting with the wind turbine emergency stop circuit. However, this device is primarily designed to ensure stopping the wind turbine in case of a sudden rotor unbalance such as by loss of a blade tip or in case of structural damage to the rotor following a lightning stroke. This prior art device cannot detect rotor blade oscillations or tower oscillations until they have reached an amplitude which presents an immediate danger to the wind turbine. Further, in the case of rotor blade oscillations even if the oscillation phenomenon of a single blade reaches a harmful amplitude, the resulting vibration level as measured e.g. at the wind turbine nacelle is relatively modest as the phenomenon generally comprises oscillations in opposite phase on two out of three rotor blades. Therefore such a device is not suitable for detecting such a harmful situation.

Further, this prior art device is generally incapable of making the wind turbine resume normal operation once the oscillations have ceased, since the device is incorporated as a part of the emergency stop circuit of the wind turbine.

Finally, self-contained vibration guards are known that may be incorporated in wind turbines. These guards permit detecting the presence of e.g. oscillations at a modest amplitude so that the dynamic load on the rotor blades can be kept within acceptable limits provided that the turbine can be stopped at the command of the vibration guard.

However, these self-contained units are normally also incorporated in the emergency stop circuit of the wind turbine and thus also cannot bring the wind turbine into normal operation once the oscillations have ceased.

For the purpose of wind turbine approval, it is also desirable that detection and countermeasures against oscillation phenomena are effected at a modest oscillation amplitude by the wind turbine control system itself not depending upon external devices.

BRIEF SUMMARY OF THE INVENTION

It is an object of the present invention to provide a method for detecting on the basis of existing measurement signals the existence of wind turbine oscillations and for attenuating these oscillations by means of the wind turbine control system.

This object is achieved by a method of the type mentioned initially, in which a spectrum analysis is performed of one or more of the measured values or any values derived therefrom, and wind turbine oscillation amplitudes are determined on the basis of the result of the spectrum analysis, and when the determined amplitude exceeds a certain value, countermeasures are taken by the wind turbine control system to reduce the amplitude of the oscillations.

This permits detection of even minor vibrations or oscillations without incorporation of external devices in the wind turbine by exploitation of the fact that the vibrations or oscillations lead to variations in the electrical measurements already being made on the wind turbine or values derived therefrom, and permits using the result of the detection to attenuate the detected vibrations or oscillations by means of the wind turbine control system.

The dependent claims define appropriate embodiments of the method according to the invention. Particularly the dependent claims 4–10 define appropriate methods of counteracting for reducing the amplitude of the detected oscillations relating to the particular type of control system provided in a wind turbine.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
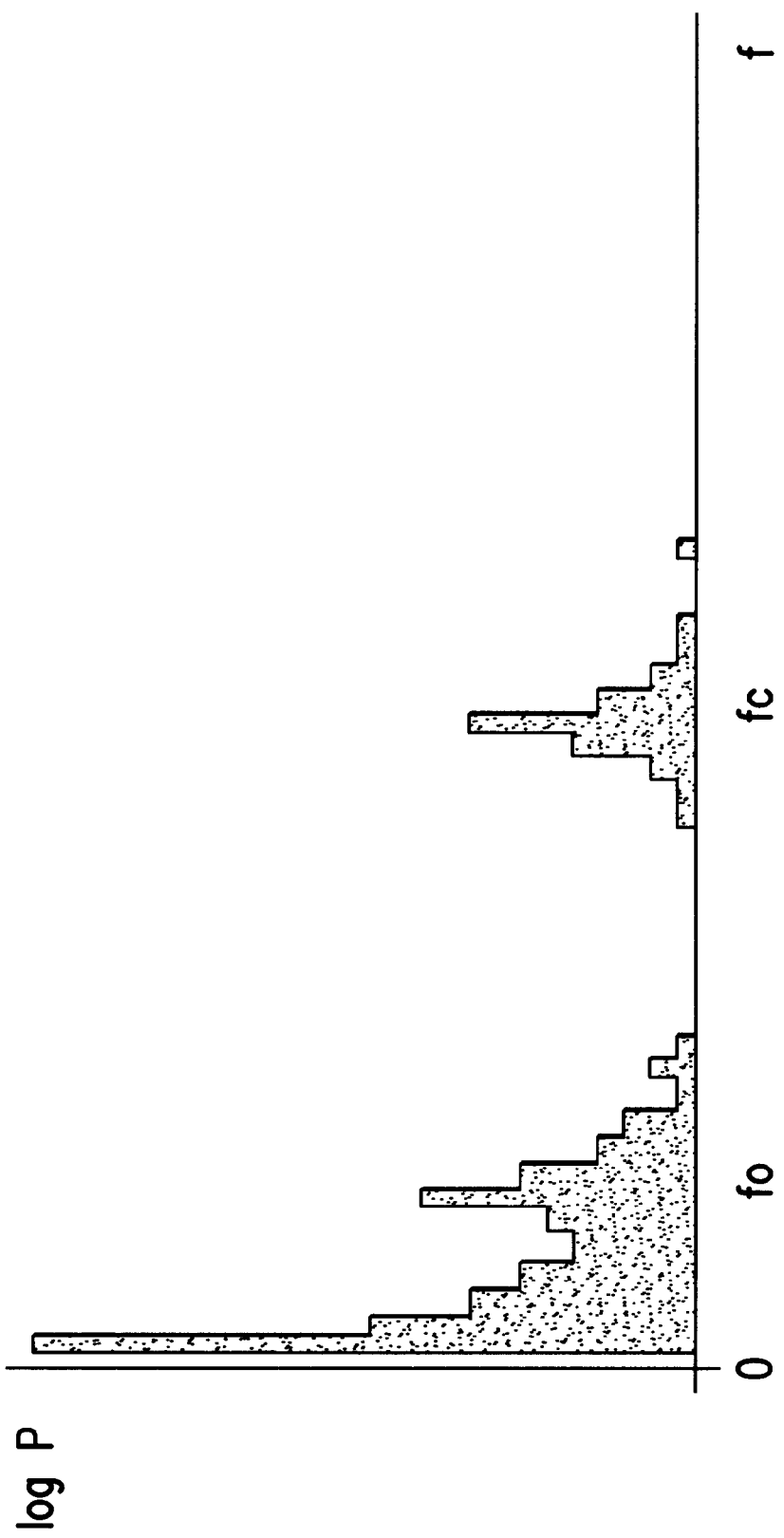
FIG. 1 illustrates a spectrum analysis of a recorded measurement of a wind turbine.
Figure 2:
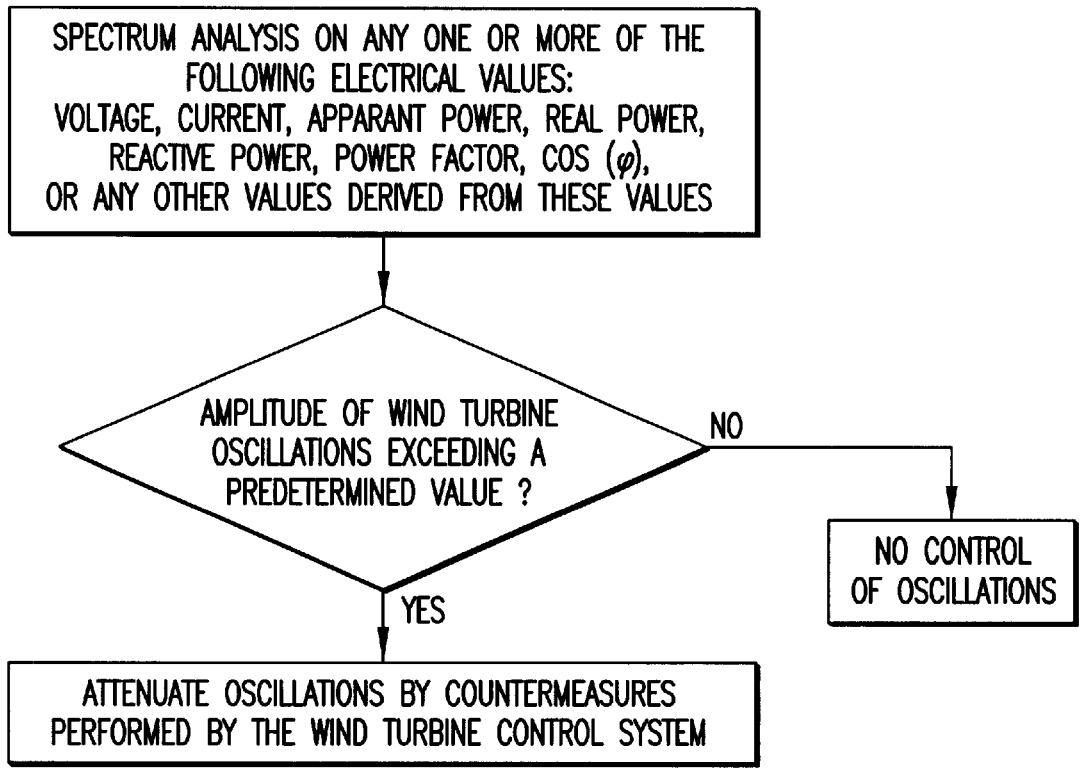
FIG. 2 illustrates a flow chart for measuring and controlling wind oscillations in a wind turbine.

The invention will be further explained in the following referring to FIG. 1 which illustrates a spectrum analysis of a recorded measurement of a wind turbine.

A wind turbine control system is always adapted to make a number of measurements reasons and partly for data logging and statistics relating to the operation of the wind turbine. For that purpose the wind turbine control system is provided with a number of transducers for measuring voltage and current of the phases of the mains connection. Based on these primary measurements of voltage and current, the control system can calculate further secondary mains data, e.g. apparent power, real power, reactive power, power factor or $\cos(\phi)$.

Rotor blade oscillations lead to vibrations in the nacelle and rotor shaft of the wind turbine. Also in case of oscillations in opposite phase on two out of three rotor blades, vibrations can be measured in the nacelle and this may be caused by an asymmetry (a non-linear elasticity) caused by the oscillation amplitude involved. Thus the rotor shaft torque will also comprise a component generated by rotor oscillations.

Since the rotor blade oscillations generate a component in the torque of the rotor shaft, such component will also appear in the generator shaft torque and in a wind turbine with a generator coupled directly to the mains. It will therefore also appear in the primary measurements of current and/or voltage and in all the secondary mains data derived from the primary measurement values.

According to the invention, the wind turbine control system performs a spectrum analysis of one or more of these sets of data and an averaging of a number of spectra. Thereby the fluctuations of the generator shaft torque generated by the oscillation phenomena will appear as a column or a narrow band of columns in the spectrum around the characteristic frequency $f_c$ of the oscillations as shown in FIG. 1. The amplitude of the column in the spectrum indicates to the control system the amplitude of oscillations of the rotor blades and thereby provides a basis for decisions on the wind turbine operation.

Axial tower oscillations, i.e. oscillations in the longitudinal direction of the main shaft, will create fluctuations in the apparent wind velocity and thereby also fluctuations in the rotor and generator shaft torques. Like rotor blade oscillations such fluctuations can be detected in the primary measurement data and in the secondary measurement data derived from the primary measurement data. By a spectrum analysis, the fluctuations will appear as a column or a narrow band of columns in the spectrum at the characteristic frequency $f_o$ as shown in FIG. 1. The amplitude of this column indicates the amplitude of the axial tower oscillations and thereby provides a basis for decisions on the wind turbine operation.

Depending on the type of the wind turbine and its equipment the control system according to the invention may operate in various ways. A first type of countermeasure seeks to attenuate the oscillation phenomena by changing the rotational speed of the rotor, while a second type seeks to change the oscillation phenomena by changing the dynamic load of the wind turbine.

For a wind turbine directly coupled to the mains, the first type of countermeasures comprises the application of brakes. Whether the brakes will be applied until standstill depends on the characteristics of the brake system used. Certain types of tip brakes can only be reset at rotor standstill, so if such types are used, the rotor must be brought to a standstill before restart. However, if tip brakes can be reset during rotation, the control system can perform a restart "on the fly" of the wind turbines once the control system has detected that the oscillations have decayed.

Utilisation of a mechanical disk brake is possible in countermeasures of the first type, but such a utilisation is believed to lead to unacceptable wear of the brake. If the wind turbine is provided with an electrically controllable brake (retarder), this may advantageously be used in the control, always permitting a restart "on the fly". Finally, in wind turbines of the active stall type with a control system according to the present invention it is possible to restart "on the fly".

The second type of countermeasure wherein the control system counteracts by changing the dynamic load may in stall controlled wind turbines with a fixed pitch angle comprise the control system introducing a yaw angle error until the oscillation phenomena disappear, whereupon the turbine resumes normal operation without yaw angle error.

The dynamic load can be changed in active stall wind turbines by changing the blade pitch angle in a negative direction until the oscillation phenomena disappear, whereupon the turbine resumes normal operation at the currently required pitch. For this type of turbine, the control system may also utilize introduction of a yaw angle error, if necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring and controlling wind oscillations in a wind turbine coupled directly to a power mains, at least one of voltage and current being measured at the mains connection, and other values optionally being derived therefrom, comprising the steps of:
    performing a spectrum analysis of one or more of the measured values or values derived therefrom;
    determining the amplitude of wind turbine oscillations based on the spectrum analysis; and
    attenuating the oscillations by countermeasures performed by the wind turbine control system, if a determined amplitude of oscillations exceeds a predetermined value.

2. The method according to claim 1, further comprising the step of averaging a number of spectra from the spectrum analysis.

3. The method according to claim 1, wherein the oscillations, the amplitudes of which are determined, are at least one of rotor blade oscillations and axial tower oscillations.

4. The method according to claim 1, wherein the step of attenuating comprises reducing the rotational speed of the rotor.

5. The method according to claim 4, wherein the step of attenuating comprises braking until standstill followed by restarting.

6. The method according to claim 4, wherein the step of attenuating comprises braking until the amplitude of the oscillations is reduced to less than a predetermined value.

7. The method according to claim 1, wherein the step of attenuating comprises reducing the dynamic load.

8. The method according to claim 7, wherein the wind turbine is a stall controlled wind turbine with a fixed pitch angle, and the step of attenuating comprises subjecting a yaw angle error to the wind turbine until the oscillation amplitude has decayed below a predetermined value whereupon the wind turbine resumes normal operation without a yaw angle error.

9. The method according to claim 7, wherein the wind turbine is an active stall controlled wind turbine with a variable pitch angle, wherein the step of attenuating comprises changing the blade pitch angle in a negative direction until the oscillation amplitude has decayed below a predetermined value whereupon the wind turbine resumes normal operation at the currently required pitch angle.

10. The method according to claim 9, wherein the step of attenuating further comprises subjecting a yaw angle error to the wind turbine until the oscillation amplitude has been decayed below a predetermined value, whereupon the wind turbine resumes normal operation without yaw angle error.

11. The method according to claim 1, wherein the other values optionally being derived include at least one of apparent power, real power, reactive power, power factor and cos ($\phi$).

12. The method according to claim 1, wherein the other values optionally being derived are based on electrical values.

13. The method according to claim 1, wherein the method for measuring and controlling occurs while generating electrical power by the wind turbine.

* * * * *